US009174173B2

(12) United States Patent
Bhattacharyya et al.

(10) Patent No.: US 9,174,173 B2
(45) Date of Patent: Nov. 3, 2015

(54) CHEMICAL PROCESSING CELL WITH NANOSTRUCTURED MEMBRANES

(75) Inventors: Dibakar Bhattacharyya, Lexington, KY (US); Scott R. Lewis, Wilmington, DE (US); Saurav Datta, Darien, IL (US)

(73) Assignee: UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 725 days.

(21) Appl. No.: 13/459,323

(22) Filed: Apr. 30, 2012

(65) Prior Publication Data

US 2013/0065287 A1    Mar. 14, 2013

Related U.S. Application Data

(60) Provisional application No. 61/532,873, filed on Sep. 9, 2011.

(51) Int. Cl.

| | |
|---|---|
| *B01D 69/10* | (2006.01) |
| *B01D 67/00* | (2006.01) |
| *B01D 71/40* | (2006.01) |
| *B01D 71/02* | (2006.01) |
| *B01D 71/34* | (2006.01) |
| *B01D 71/44* | (2006.01) |
| *B82Y 30/00* | (2011.01) |
| *B82Y 40/00* | (2011.01) |
| *C02F 1/00* | (2006.01) |
| *C02F 1/70* | (2006.01) |

(52) U.S. Cl.
CPC ............ *B01D 69/10* (2013.01); *B01D 67/0079* (2013.01); *B01D 67/0088* (2013.01); *B01D 67/0093* (2013.01); *B01D 71/40* (2013.01); *B01D 71/022* (2013.01); *B01D 71/34* (2013.01); *B01D 71/44* (2013.01); *B01D 2323/30* (2013.01); *B01D 2323/40* (2013.01); *B82Y 30/00* (2013.01); *B82Y 40/00* (2013.01); *C02F 1/001* (2013.01); *C02F 1/70* (2013.01)

(58) Field of Classification Search
None
See application file for complete search history.

(56) References Cited

U.S. PATENT DOCUMENTS

| | | | |
|---|---|---|---|
| 4,680,268 A | * | 7/1987 | Clark, Jr. ...................... 205/778 |
| 4,795,707 A | | 1/1989 | Niyama et al. |
| 5,352,348 A | | 10/1994 | Young et al. |
| 6,103,121 A | | 8/2000 | Bhattacharyya et al. |
| 6,139,742 A | | 10/2000 | Bhattacharyya et al. |
| 6,306,301 B1 | | 10/2001 | Bhattacharyya et al. |
| 6,544,418 B1 | | 4/2003 | Bhattacharyya et al. |
| 6,544,419 B1 | | 4/2003 | Bhattacharyya et al. |
| 7,563,588 B2 | | 7/2009 | Gao et al. |
| 7,717,271 B2 | | 5/2010 | Ramaswamy et al. |
| 7,776,425 B2 | | 8/2010 | Kalkan et al. |
| 2009/0169630 A1 | | 7/2009 | Ward et al. |
| 2009/0269491 A1 | | 10/2009 | Hammond-Cunningham et al. |
| 2010/0215555 A1 | | 8/2010 | Jin et al. |
| 2010/0224555 A1 | | 9/2010 | Hoek et al. |
| 2011/0014550 A1 | | 1/2011 | Jiang et al. |
| 2011/0017661 A1 | | 1/2011 | Kosar |
| 2011/0027599 A1 | | 2/2011 | Hoek et al. |
| 2013/0032493 A1 | * | 2/2013 | Karlsson et al. ............. 205/782 |

OTHER PUBLICATIONS

Merlin L. Bruening et al.; "Creation of Functional Membranes Using Polyelectrolyte Multilayers and Polymer Brushes"; Langmuir, vol. 24, No. 15, pp. 7663-7673; American Chemical Society, May 29, 2008.
Martien A. Cohen Stuart et al.; "Emerging applications of stimuli-responsive polymer materials"; Nature Materials, vol. 9, pp. 101-113; Macmillan Publishers Limited, Feb. 2010.
Saurav Datta et al.; "Functionalized Membranes by Layer-by-Layer Assembly of Polyelectrolytes and In Situ Polymerization of Acrylic Acid for Applications in Enzymatic Catalysis"; Industrial & Engineering Chemical Research, vol. 47, No. 14, pp. 4586-4597; American Chemical Society, Jun. 20, 2008.
Gilbert S. Omenn; "Grand Challenges and Great Opportunities in Science, Technology, and Public Policy"; Science, vol. 314, pp. 1696-1704; Association Affairs, Dec. 15, 2006.
V. Smuleac, et al.; "Green synthesis of Fe and Fe/Pd bimetallic nanoparticles in membranes for reductive degradation of chlorinated organics"; Elsevier: Journal of Membrane Science (2011), vol. 379, pp. 131-137.
Kang Hu et al.; "In vitro investigation of potential application of pH-sensitive poly(vinylidene fluoride)-poly(acrylic acid) pore-filled membranes for controlled drug release in ruminant animals"; Elsevier: Journal of Membrane Science (2009), vol. 337, pp. 9-16.
Y. Park, et al.; "Polysaccharides and phytochemicals: a natural reservoir for the green synthesis of gold and silver nanoparticles"; IET Nanobiotechnology (2011), vol. 5, Issue 3, pp. 69-78.
Scott R. Lewis, et al.; "Reactive nanostructured membranes for water purification"; PNAS, May 24, 2011, vol. 108, No. 21, pp. 8577-8582.
Mark A. Shannon, et al.; "Science and technology for water purification in the coming decades"; Nature Publishing Group; Mar. 20, 2008, vol. 452, pp. 301-310.
Scott Lewis, et al.; "Iron-Functionalized Membranes for Nanoparticle Synthesis and Reactions"; Taylor & Francis Group, LLC; Separation Science and Technology (2009), vol. 44, pp. 3289-3311.
Francoise M. Winnik, et al.; "Polyacrylic acid pore-filled microporous membranes and their use in membrane-mediated synthesis of nanocrystalline ferrihydrite"; NRC Canada (1998); Can. J. Chem. 76(1), 1 page.
AShok Kumar, et al.; "Smart polymers: Physical forms and bioengineering applications"; Elsevier: ScienceDirect, Progress in Polymer Science vol. 32, (2007) pp. 1205-1237.
Daniel Wandera, et al.; "Stimuli-responsive membranes"; Elsevier: Journal of Membrane Science (2010), vol. 357, pp. 6-35.
Lewis et al.; "SI Results and Discussion"; PNAS; pp. 1-4; www.pnas.org/cgi/doi/10.1073/pnas.1101144108.
T. C. Merkel, et al.; "Ultrapermeable, Reverse-Selective Nanocomposite Membranes"; Science (Apr. 19, 2002), vol. 296, pp. 519-522.
E.M. Gabriel et al.; "In Situ Modification of Microporous Membranes"; Journal of Applied Polymer Science, vol. 48, pp. 2081-2090; Jun. 20, 1993.

* cited by examiner

*Primary Examiner* — Anand Desai

(74) *Attorney, Agent, or Firm* — King & Schickli, PLLC

(57) ABSTRACT

A chemical processing cell includes an upstream membrane and a downstream membrane. The upstream membrane generates a first reaction product. The downstream membrane converts the first reaction product to a second reaction product.

20 Claims, 7 Drawing Sheets

CHEMICAL PROCESSING CELL WITH NANOSTRUCTURED MEMBRANES

This application claims the benefit of U.S. Provisional Patent Application Ser. No. 61/532,873 filed on 9 Sep. 2011, the entire disclosure of which is incorporated herein by reference.

This invention was made with at least partial government support under NIEHS contract No. P42ES007380, and under NSF-IGERT contract No. DGE-0653710. The government may have certain rights in this invention.

TECHNICAL FIELD

This document relates generally to chemical processing and more particularly to cells and related methods for chemical processing using stacked, nano-structured membranes.

BACKGROUND SECTION

Membrane-based separations and reactions have wide applications ranging from clean water production to selective separations, chemical synthesis and biotechnology. The availability of high-capacity membranes for efficient, selective catalysis with facile in-situ regenerability is much needed for economic and sustainable exploitation of a wide range of applications, such as green synthesis of chemicals, toxic metals removal or toxic organics destruction in polluted water.

This document describes in detail chemical processing cells and methods using stacked, nano-structured membranes wherein the catalaysts associated with those membranes are immobilized in the pores of the membranes. As a result, the membranes are tuneable by operating pH, ionic strength or pressure to provide for reaction and separation selectivity. Two distinct membrane types particularly useful in the stacked nano-structured membrane chemical processing cells include (1) membranes with layer-by-layer assembly incorporating enzymes such as catalase and glucose oxidase in the pores of the membranes and (2) membranes with in-situ, green synthesis nanoparticles in the pores of the membrane.

SUMMARY SECTION

A chemical processing cell may be broadly described as comprising an upstream membrane including a plurality of pores. A first catalyst is immobilized within the first plurality of pores in the upstream membrane. The first catalyst produces a first reaction product from a starting material that passes into the first plurality of pores. The chemical processing cell further includes a downstream membrane including a second plurality of pores. A second catalyst is immobilized within the second plurality of pores in the downstream membrane. The second catalyst produces a second reaction product from the first reaction product passing into the second plurality of pores.

More specifically, the chemical processing cell may be described as comprising an upstream membrane generating hydrogen peroxide from a starting material and a downstream membrane decomposing the hydrogen peroxide generated by the upstream membrane. In one useful embodiment the upstream membrane is a bioactive membrane containing immobilized glucose oxidase for catalytic production of hydrogen peroxide from glucose starting material. The downstream membrane is a membrane containing an immobilized metal catalyst that decomposes the hydrogen peroxide produced by the upstream membrane into free radical oxidants.

In another possible embodiment the upstream membrane is a bio-active membrane containing immobilized glucose oxidase for catalytic production of hydrogen peroxide and gluconic acid from glucose starting material. The downstream membrane is a bioactive membrane containing immobilized catalase enzyme that decomposes hydrogen peroxide produced by the upstream membrane into water and oxygen.

Still more specifically, the upstream membrane includes pores containing glucose oxidase. The downstream membrane includes pores containing a material selected from a group consisting of metal, iron, iron oxide nanoparticles, iron oxyhydroxide nanoparticles, ferrihydrite, catalase enzyme and mixtures thereof. In one particularly useful embodiment, the upstream membrane is a layer-by-layer assembly of glucose oxidase in a regenerated cellulose membrane. The downstream membrane is a poly(vinylidene fluoride) membrane with poly(acrylic acid) functionalized pores containing immobilized metal, iron, metal ion, iron ion, iron oxide nanoparticles, iron oxyhydroxide nanoparticles, ferrihydrite nanoparticles and mixtures thereof. Alternatively the downstream membrane is a poly(vinylidene fluoride) membrane with poly(acrylic acid) functionalized pores containing immobilized catalase enzyme. In any of the embodiments, a housing is provided for holding the upstream membrane and downstream membrane in a flow pathway.

In accordance with another aspect, a method of chemical processing comprises the steps of: (1) passing a starting material into a first plurality of pores in an upstream membrane; (2) reacting that starting material with a first catalyst immobilized in the first plurality of pores in the upstream membrane so as to produce a first reaction product; (3) passing the first reaction product into a second plurality of pores in a downstream membrane; and (4) reacting the first reaction product with a second catalyst immobilized in the second plurality of pores in the downstream membrane so as to produce a second reaction product. Further, the method includes controlling the residence time of the starting material in the first plurality of pores and the residence time of the first reaction product in the second plurality of pores.

In addition a method of detoxifying a water supply comprises passing the water supply containing a target chemical and a hydrogen peroxide precursor through a chemical processing cell including an upstream membrane that generates hydrogen peroxide from the hydrogen peroxide precursor and a downstream membrane that decomposes the hydrogen peroxide generated by the upstream membrane into free radical oxidants. Glucose may be provided as the hydrogen peroxide precursor and that glucose may be reacted with glucose oxidase that is immobilized in the pores of the upstream membrane to produce hydrogen peroxide. Further the method includes reacting the hydrogen peroxide generated by the upstream membrane with metal ions, iron ion, ferrihydrite/iron oxide nanoparticles and mixtures thereof immobilized in the pores of the downstream membrane to produce free radical oxidants. The target chemical reacts with the free radical oxidants in the pores of the downstream membrane and is decomposed thereby cleaning or detoxifying the water supply.

In addition a method of generating gluconic acid comprises passing glucose through a chemical processing cell including an upstream membrane that generates hydrogen peroxide and gluconic acid from the glucose, and a downstream membrane, that decomposes the hydrogen peroxide generated by the upstream membrane into water and oxygen. This method further includes reacting the glucose with glucose oxidase immobilized in the pores of the upstream membrane and reacting the hydrogen peroxide generated by with the upstream membrane with catalase enzyme immobilized in the downstream membrane.

BRIEF DESCRIPTION OF THE DRAWING FIGURES

The accompanying drawings incorporated herein and forming a part of the specification, illustrate several aspects of the chemical processing cell and together with the description serve to explain certain principles thereof. In the drawings.

Figure 4:
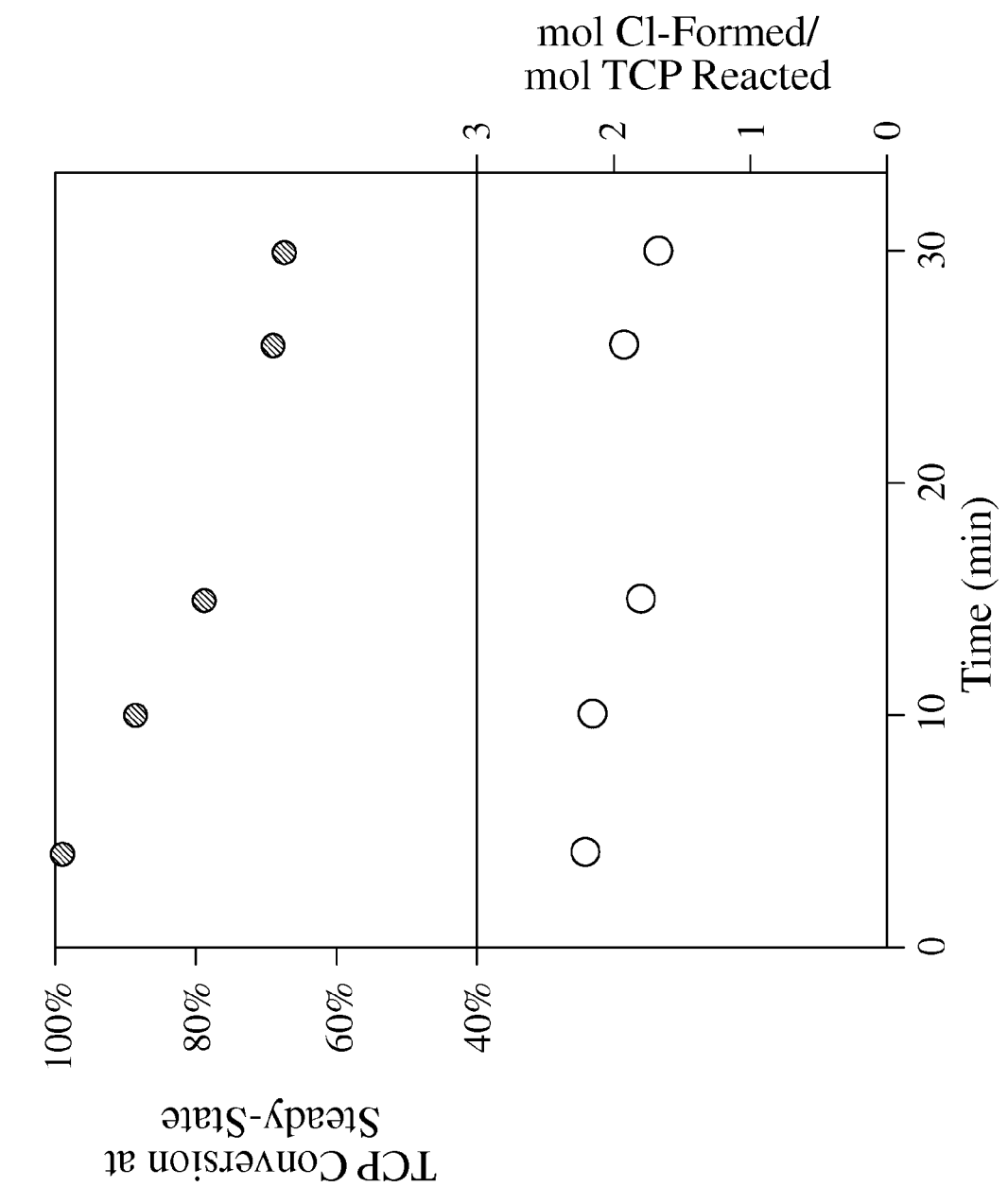

FIG. 4 graphically illustrates trichlorophenol (TCP) conversion at steady state and Cl⁻ formation as a function of time.

Reference will now be made in detail to the present preferred embodiments of chemical processing cells, examples of which are illustrated in the accompanying drawings.

DETAILED DESCRIPTION OF THE INVENTION

Figure 1:
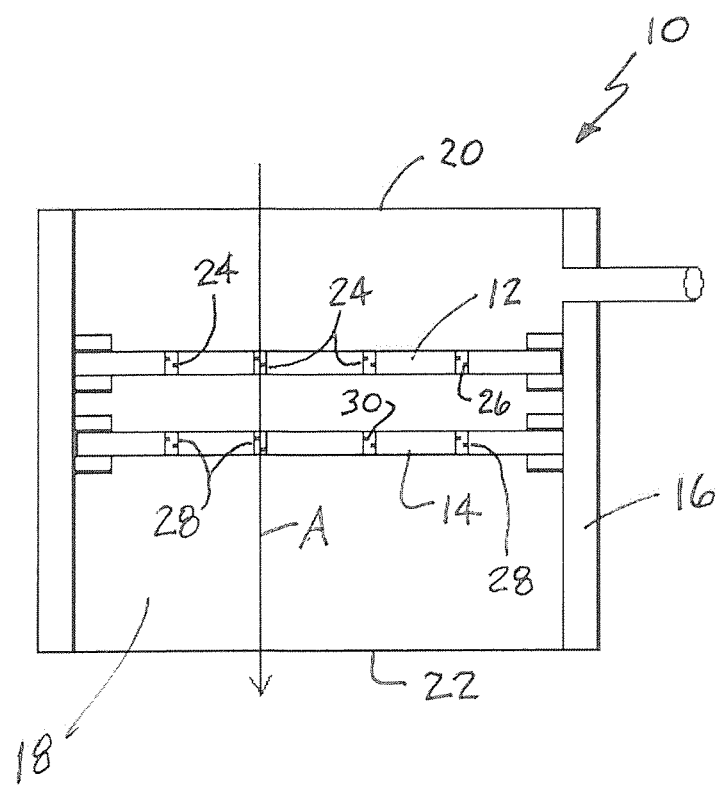
FIG. 1 is a schematical representation of the chemical processing cell of the present invention.

Reference is now made to FIG. 1 schematically illustrating a processing cell 10 including a first or upstream membrane 12 and a second or downstream membrane 14. As should be appreciated, the first and second membranes 12, 14 are held in position by a housing 16 which defines a flow pathway 18 from an inlet end 20 to an outlet end 22 (note action arrow A illustrating direction of flow through the processing cell 10).

The upstream membrane 12 includes a first plurality of pores 24. A first catalyst 26 is immobilized within the first plurality of pores 24. The downstream membrane 14 includes a second plurality of pores 28. A second catalyst 30 is immobilized within the second plurality of pores of the downstream membrane 14.

In use the first catalyst 26 produces a first reaction product from a starting material that passes into the first plurality of pores 24 from the inlet end 20 or an optional secondary inlet 32. The second catalyst 30 produces a second reaction product from the first reaction product passing into the second plurality of pores 28 from the upstream membrane 12. The second reaction product then passes from the outlet end 22 of the chemical processing cell. Note the direction of flow through the processing cell (see action arrow A).

Figure 2:
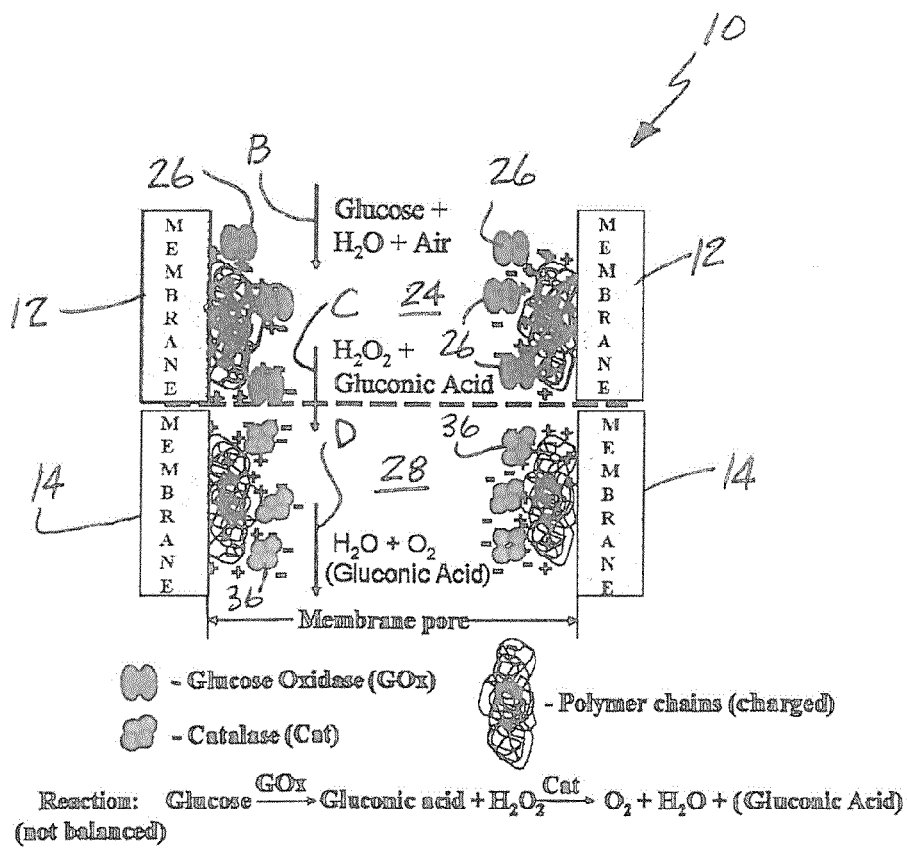
FIG. 2 is a schematical cross-sectional view of a first embodiment of chemical processing cell adapted for producing gluconic acid.
Figure 2A:
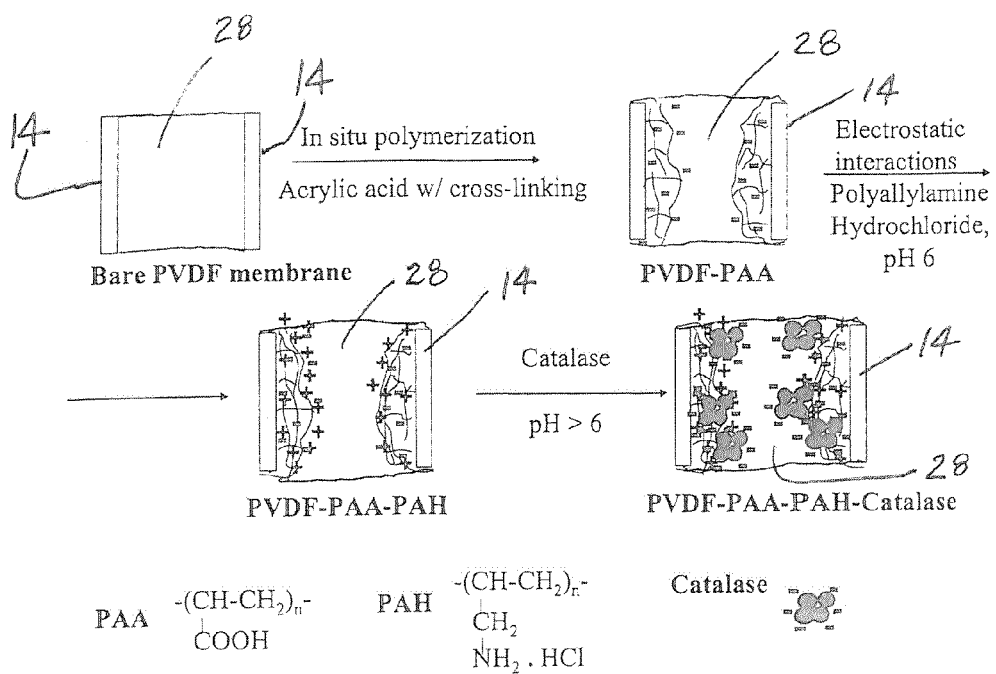
FIG. 2A is a schematical representation of the process for making the downstream membrane utilized in the first embodiment of chemical processing cell illustrated in FIG. 2.

Reference is now made to FIG. 2 schematically illustrating the upstream membrane 12 and downstream membrane 14 of a chemical processing cell 10 specifically adapted for producing gluconic acid. In this embodiment each pore 24 in the upstream membrane 12 has been functionalized so as to immobilize glucose oxidase enzyme 26 within the pore. In contrast, each pore 28 in the downstream membrane 14 has been functionalized so as to immobilize catalase enzyme within each of the pores. As illustrated by action arrow B glucose, water and air (oxygen) pass through each pore 24 of the upstream membrane 12. The glucose oxidase immobilized within each pore 24 generates hydrogen peroxide and gluconic acid from the glucose, water and air passing into the pore. The hydrogen peroxide and gluconic acid then pass (note arrow C) from each pore 24 of the upstream membrane 12 into each pore 28 of the downstream membrane 14 (see action arrow D). The catalase enzyme 36 immobilized within each pore 28 functions to decompose the hydrogen peroxide passing into the pore into water and oxygen. The water, oxygen and gluconic acid then pass from each of the pores 28 in the downstream membrane 14. The water and oxygen may be recycled as starting materials to the first membrane. The gluconic acid may be collected for further processing or as a marketable commercial product.

Figure 3:
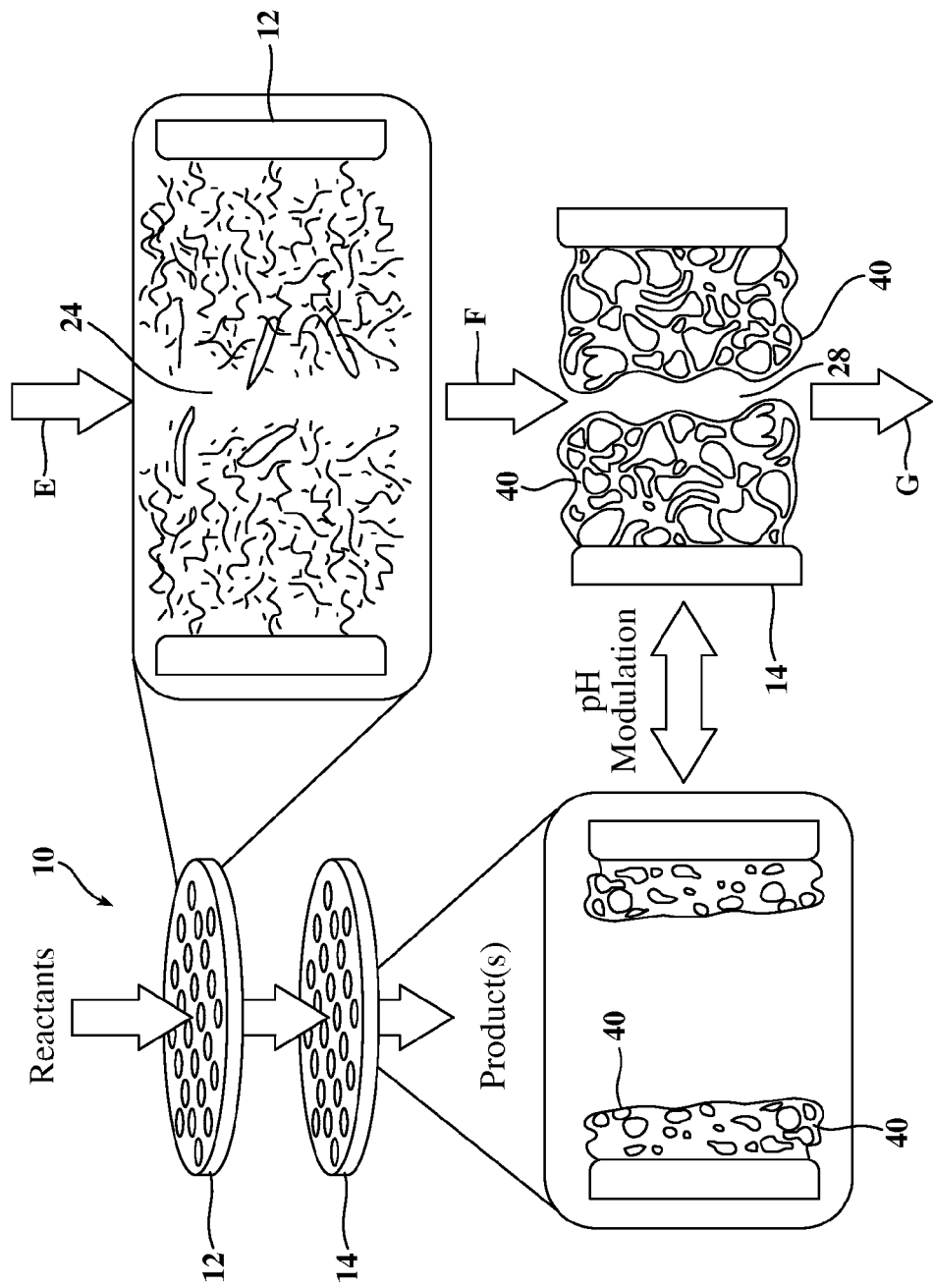
FIG. 3 is a schematical cross-sectional view of a second embodiment of chemical processing cell adapted for detoxifying a water supply.

FIG. 3 is a schematical illustration of the upstream membrane 12 and downstream membrane 14 of a chemical processing cell 10 adapted to detoxify a water supply. As illustrated each pore 24 of the upstream membrane 12 has been functionalized with layer-by-layer polycation/polyanion assembly containing electrostatically immobilized glucose oxidase for the conversion of reactants glucose and water into gluconic acid and hydrogen peroxide (note action arrow E illustrating glucose and water containing dissolved oxygen passing into the pore 24). The gluconic acid and hydrogen peroxide then pass out of each pore 24 into each pore 28 of the downstream membrane 14 (note action arrow F). Each pore 28 of the downstream membrane 14 consists of a pH-responsive poly(acrylic acid) gel with immobilized metal, iron, metal ion, iron ion, iron oxide nanoparticles iron oxyhydroxide nanoparticles, ferrihydrite nanoparticles, and mixtures thereof. As should be appreciated, the metal, metal ions or nanoparticles 40 are immobilized within each pore 28. The hydrogen peroxide entering each pore 28 is catalyzed by the nanoparticles 40 so as to decompose into free radical oxidants of a type well known to decompose toxic chemical compounds into non toxic salts and related environmentally safe compounds. In particular, such a cell 10 is particularly useful in decomposing chlorinated organics such as trichloroethylene, a particularly carcinogenic compound and 2,4,6-trichlorophenol, a carcinogenic and persistent pollutant. The detoxified water is then expelled from the pores 28 of the downstream membrane 14 as illustrated by action arrow G. More specifically, the main reaction for the formation of free radicals from $Fe^{2+}$ and $H_2O_2$ is as follows

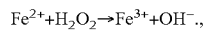

$$Fe^{2+}+H_2O_2 \rightarrow Fe^{3+}+OH^-.,$$

Where OH· is the hydroxyl radical. Although additional propagation reactions take place during this process, hydroxyl radicals are responsible for the majority of contaminant degradation, which proceeds as follows for a chlorinated organic compound, A

$$A + OH\cdot \longrightarrow I \xrightarrow{OH\cdot} P + Cl^-,$$

Where I represents the intermediate compounds formed and P represents the oxidized products of the chlorinated organics. Although these free radical reactions are highly effective for degrading organic contaminants, they may require the addition of expensive reagents and downstream processing. However, by integrating the oxidative reactions into a membrane-based process through the use of uniquely functionalized membranes in sequential configuration we are able to minimize the disadvantages associated with the individual processes.

The reaction rate for the decomposition of the chlorinated organics may be easily adjusted by varying the amount of iron loading of the membrane, the rate of $H_2O_2$ production, the pore size via change in stimulus (e.g. pH), the thickness of the membrane and/or the residence time of the chlorinated organics in the pores of the membrane.

As further illustrated in FIG. 3, it should be appreciated that the pH of the solution passing through the processing cell 10 may be modulated to contract or swell the membrane 14 thereby altering the size of pores 28 to control the rate of flow through the processing cell 10 and, more particularly, the residence time of the chemical species in the pores 24, 28 for purposes for completing the desired chemical reactions. More specifically, at a pH of about 4 the PAA is nonionized and will shrink in the pores 28 thereby increasing flow through the cell 10. In contrast, at a pH of about 5, the PAA expands in the pores 28 due to ionization. This decreases flow through the pores 28 and the cell 10. As should be appreciated this pH controlled tuning of the pore structure of the membrane can also be used to bring immobilized reactants on the pore walls into closer proximity to the feed solution permeating through the membrane.

Alternatively one can simply vary the applied pressure to alter the rate of flow of solution through the membranes 12, 14 and, therefore, the residence time of chemical species in the pores 24, 28. Residence times of anywhere from, for example, five seconds to one minute may be reliably obtained. The higher residence times insure higher conversion rates. For a consecutive reaction one can also selectively obtain the desired intermediate product by adjusting the residence time.

Reference is now made to 2A schematically illustrating the in-situ modification of the pores of the downstream membrane 14 utilized in a processing cell 10 for producing gluconic acid. First the membrane, such as a poly(vinylidene fluoride) membrane (PVDF membrane) is functionalized with poly(acrylic acid) (PAA) by in-situ polymerization of acrylic acid and subsequent deposition occurs by multiple electrostatic interactions between the absorbing polyelectrolyte and the oppositely charged layer already on the membrane. Poly(allylamine hydrochloride) (PAH) is used as a second layer and thus a PAA-PAH functionalized PVDF membrane (with an overall positive charge) is formed. The enzyme is immobilized on the polyelectrolyte assembled membrane in the pores 28 via electrostatic interaction. Catalase, with an isoelectric point, pI5.7, is immobilized on positively charged membranes at pH7. At this pH, catalase has an overall negative charge and can be easily incorporated in a positively charged membrane (PAA-PAH, pKa for PAH is approximately 8.8).

A second enzyme, glucose oxidase, GOx(pI4.2) may also be immobilized on a two-layer assembly consisting of PAA-PAH. This electrostatic interaction is conducted also at a pH of 7 where the GOx has an overall negative charge opposite to that of the membrane. In contrast, an enzyme with an overall positive charge, such as trypsin, subtilisin, alkaline xynalase and alkaline phosphatase, may be immobilized on a three layer assembly consisting of PAA-PAH-PSS (overall positively charged) where PSS is polystyrene sulfonate.

Figure 2B:
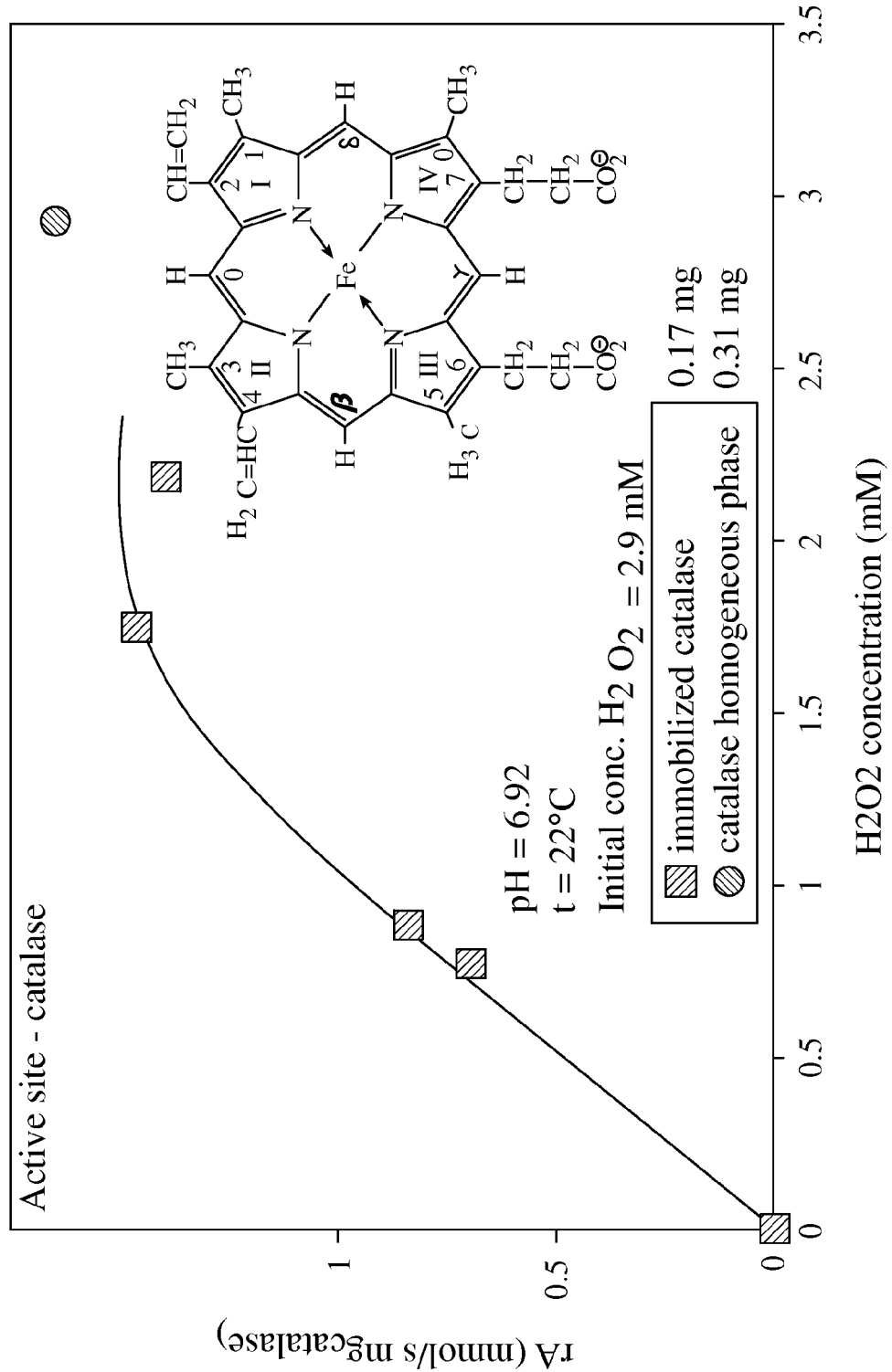
FIG. 2B is a graphically illustration of the rate of hydrogen peroxide decomposition as a function of substrate concentration.

For one embodiment of chemical processing cell, catalase activities, in the free and immobilized forms, were evaluated using the Michaelis-Menten model using rate data obtained by pressure-driven convective flow ensuring accessibility to all active sites. FIG. 2B shows the hydrogen peroxide degradation rates at four substrate concentrations. At the saturation condition the membrane-immobilized catalase activity is very similar to that in homogenous phase (90%), superior to many immobilization techniques. It is well known that other common approaches for enzyme immobilization, such as covalent attachment, result in significant loss of activity. For glucose oxidase in particular, a recent report showed a sevenfold reduction of activity upon covalent immobilization (on a porous alumina support), compared to the activity in the homogeneous (bulk) phase.

Figure 2C:
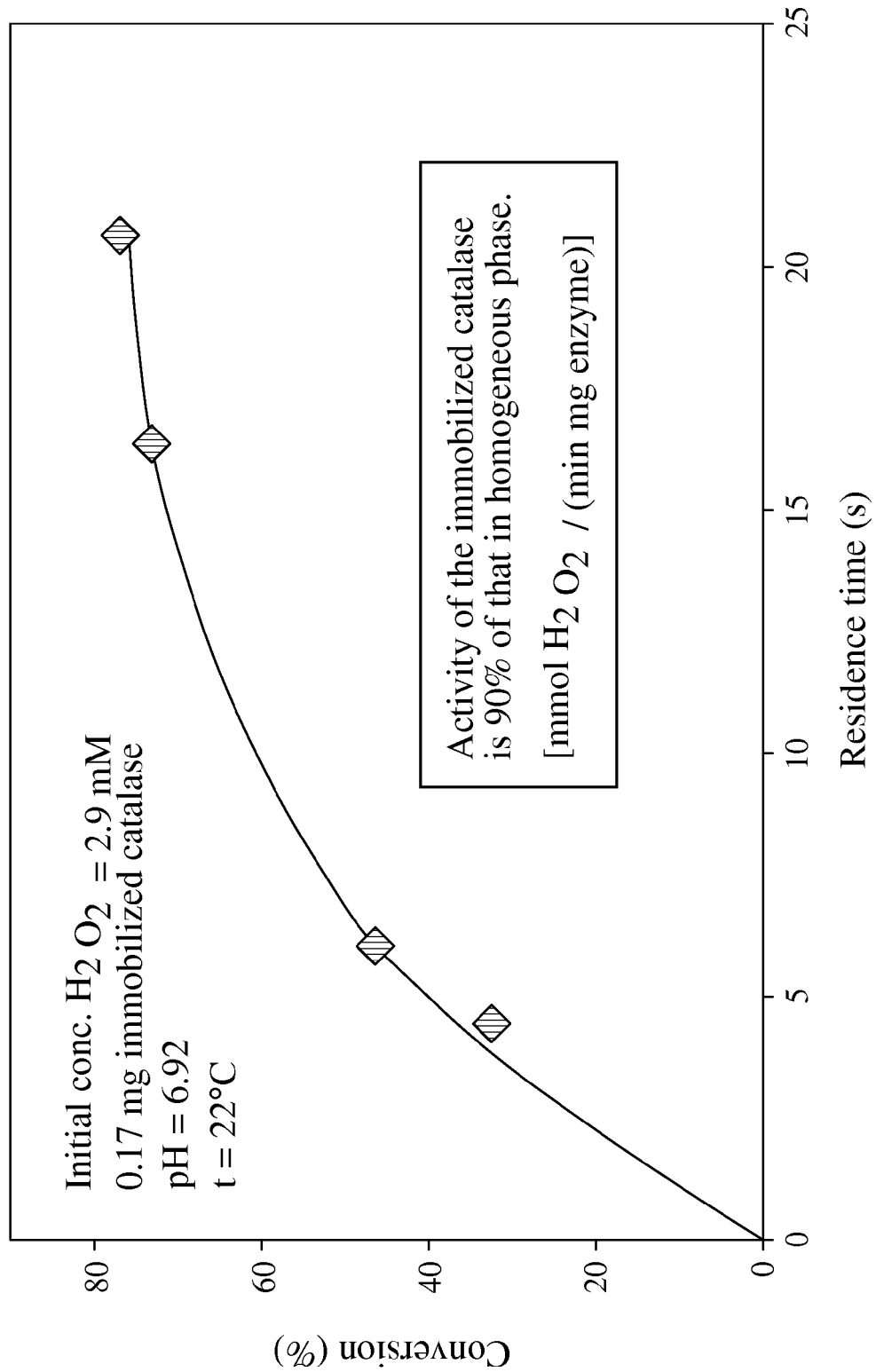
FIG. 2C is a graphically representation of the hydrogen peroxide conversion as a function of residence time in the membrane pore with catalase enzyme in layer-by-layer assembly.

As previously noted, the present chemical processing cell 10 also allows tuning of product yield through variation of residence time ($\tau$) in membrane pores. The residence time is calculated as $\tau=V/(AJ_v)$, where V is the membrane volume, A is the external area (33.2 cm$^2$), and $J_v$ is the permeation flux (cm$^3$/cm$^2$/s). In addition, $V=\epsilon AL$, where c is the porosity (70% on average, from manufacturer's data) and L is the membrane thickness (125 µm). The flux (and $\tau$) can be modulated by changing the applied pressure; varying the pressure between 0.3 and 1.4 bars caused a flux change from 3-12× $10^{-4}$ cm$^3$/cm$^2$/s. Low pressure operations reduce energy consumption significantly. The relationship between the residence time and reactant conversion at steady state is shown in FIG. 2C. Thus, in addition to flux (throughout rates), product yield can be modulated by changing the operating pressure.

The following examples are presented to further illustrate the chemical processing cells 10.

Top and Bottom Membrane Functionalization for Use in Stacked Membrane

Top Membrane (RC-LbL-GOx) Functionalization

The following procedure was used to create the layer-by-layer (LbL) assembly in regenerated cellulose (RC) membranes (200 nm pore diameter, 125 µm thickness). Epoxide groups were attached to the RC membrane by permeating 100 ml of 5% solution of epichlorohydrin (ECH) in 0.5 M NaOH at 50° C. The amount of functionality (epoxide group) introduced in the RC membrane was $8.5\times10^{-2}$ µmol/cm$^2$ as determined by reacting the epoxide groups with the amine groups of a probe molecule, para-amino benzoic acid (PABA). Then, the epoxide-activated RC membrane was reacted (covalent bonding) with the terminal amine group of PLL by permeating 100 ml of 40 ppm aqueous solution of PLL (4 mg or 0.039 µmol PLL) at 0.07 bar (1 psi) pressure and a pH of 9.3. The subsequent layer formation steps were carried out electrostatically at a working pH of 6 and in the presence of 0.25 M NaCl. The second layer of PSS was attached by permeating 100 ml of a 400 ppm solution of PSS (40 mg PSS, 0.2 mmol of negative charges) at pH 6. The next layer of PAH was formed by permeating 100 ml of a 300 ppm solution of PAH (30 mg PAH, 0.3 mmol of positive charges) at pH 6. After this, two more bi-layers of PSS-PAH were attached in the membrane to obtain a net positively charged RC-PLL-(PSS-PAH)$_3$ membrane. GOx (Glucose Oxidase enzyme) was immobilized electrostatically in the pores of this membrane by permeating 100 ml of a 25 ppm solution at pH 6. The GOx immobilized membranes were stored at 4° C. The enzyme can also be immobilized in PVDF-PAA membranes, and we have already published this part.

Bottom (PVDF-PAA-Fe$^{2+}$) Membrane Functionalization

Hydrophobic PVDF membrane (450 nm pore diameter, 125 µm thickness) with PAA (PVDF-PAA) by in-situ polymerization of acrylic acid. The polymerization solution contained 70 wt % toluene, 30 wt % acrylic acid, 0.5 wt % benzoyl peroxide (initiator) and 1.2 wt % trimethylolpropane triacrylate (TMPTA, cross-linker) by weight. After polymerization, PAA was converted to Na-form by permeating 0.1 M NaOH through the pores of the PVDF-PAA membrane. Then, 100 ml of a 3.8 mmol/L solution of FeCl$_2$.4H$_2$O in deoxygenated water (pH of 5-5.5) was permeated to immobilize $Fe^{2+}$ in the pores. Prior to and after the ion exchange step, the membrane matrix was washed with copious amount of deoxygenated water. Since $Fe^{2+}$ is prone to oxidation by $O_2$, these membranes were either used immediately or kept in anaerobic environments.

Stacked Membrane System for the Production of Gluconic Acid

The composite membrane reactor was formed by stacking the RC-LbL-GOx membrane on top of the $Fe^{2+}$ immobilized PVDF membrane in a convective flow cell. A reaction mixture containing 1 mmol/L β-D(+)-Glucose, simply referred to as glucose, was prepared in $O_2$-saturated sodium acetate-acetic acid buffer of pH 5.5, and permeated through the stacked membrane system under $N_2$ atmosphere. The permeate contained gluconic acid with or without hydrogen peroxide and/or glucose.

Stacked Membrane System for the Detoxification of Water

The composite membrane reactor was formed by stacking the RC-LbL-GOx membrane on top of the $Fe^{2+}$ immobilized PVDF membrane in a convective flow cell. A reaction mixture containing either 0.07 or 0.14 mmol/L TCP and 1 mmol/L β-D(+)-Glucose, simply referred to as glucose, was prepared in $O_2$-saturated sodium acetate-acetic acid buffer of pH 5.5, and permeated through the stacked membrane system under $N_2$ atmosphere. The oxidative degradation of trichlorophenol (TCP) was carried out with a configuration consisting of the RC-LbL-GOx membrane on top of the PVDF-PAA-$Fe^{2+}$ membrane (FIG. 1A). The process began by convectively permeating an oxygen-saturated solution of TCP and glucose through the membrane stack. Maintaining positive pressure drop across the membrane stack prevented free radicals from entering the top membrane.

Using a constant residence time, the initial conversion of TCP was 100%, but decreased with time, reaching 55-70% after 30 min (see FIG. 4). This decrease in TCP conversion is characteristic of these PVDF-PAA-$Fe^{2+}$ membranes as the immobilized $Fe^{2+}$ is converted to $Fe^{3+}$, Chloride formation and TCP concentration in the permeate were monitored to ensure degradation via oxidation (FIG. 1B). Although the TCP conversion initially decreased, the ratio of mol CF formed to mol TCP reacted remained relatively constant (~2) through the entire experiment, indicating significant TCP degradation (maximum Cl⁻ released per TCP molecule is 3). The TCP conversion can be easily adjusted by varying the amount of iron loading, the ratio of $Fe^{2+}$ to $Fe^{3+}$, the rate of $H_2O_2$ production, the pore size via change in stimulus, the thickness of the membranes used, and/or residence time through pressure modulation. It should be noted that these residence times are calculated for the entire membrane, not individual pores.

FIG. 4 illustrates TCP conversion at steady-state and CF formation as a function of time. Squares: 0.142 mmol/L TCP in feed; circles: 0.076 mmol/L TCP in feed. Maximum mol Cl⁻ formed/mol TCP reacted=3. Steady state concentration of $H_2O_2$ from the first membrane was 0.1 mmol/L (circles) and 0.13 mmol/L (squares), Fe loading=0.09 mmol, pH 5.5, residence time in the top membrane=2.7 s, residence time in the bottom membrane=2 s.

Synthesis of Membrane-Immobilized Ferrihydrite/Iron Oxide Nanoparticles

Direct Ferrihydrite/Iron Oxide Nanoparticle Synthesis in Membrane Pores

A PVDF-PAA-$Fe^{2+}$ membrane with sub-maximal iron loading was added to a stirred buffered solution at pH 5.5-6.5 with 0.2 M $H_2O_2$ for 1 h (3). The membrane was washed with deionized (DI) water and immersed in a solution at pH 13.5 for 2-3 h. After rinsing the membrane, it was dried at 80° C. for 1 h before SEM and Mossbauer spectroscopy analysis. It should be noted that the drying step had no effect on the iron oxide structure, as confirmed by Mössbauer analysis of similar samples prepared without drying at elevated temperature. All pH adjustments were performed using NaOH. The reactivity of these composite membranes for free radical reactions was established by $H_2O_2$ decomposition in solution.

PVDF-PAA-Fe/$Fe_xO_y$ Membrane Synthesis

An aqueous-based method was used to functionalize the pores of a hydrophilic PVDF membrane (650 nm pore diameter, 125 μm thickness) with PAA (PVDF-PAA) by in-situ polymerization of acrylic acid. The polymerization solution contained 30 wt % acrylic acid (monomer), ethylene glycol (cross-linker, added in a 1:10 molar ratio of EG to acrylic acid), 1 wt % potassium persulfate (initiator), and the remainder DI water (2). A PVDF membrane was dipped in the polymerization solution for 5 minutes, sandwiched between 2 teflon plates and placed in an oven at 90° C. for 4 hours in a $N_2$ atmosphere. After polymerization, PAA was converted to Na-form by soaking in 0.1 mol/L NaOH. The membrane was then rinsed with DI water the membrane was soaked in a 200 mL solution containing 3.6 mmol/L $FeCl_2 \cdot 4H_2O$ in deoxygenated water (pH of 5-5.5) for 4 h to immobilize $Fe^{2+}$. The membrane was then added to 50 mL of 265 mmol/L $NaBH_4$ to reduce the immobilized iron ions to $Fe^0$ nanoparticles. In order to form the ferrihydrite/iron oxide nanoparticles from the $Fe^0$, the membrane was transferred to DI water where it was purged with air at a rate of 40 mL/min for 12 h.

TCE Dechlorination Using PVDF-PAA-Fe/$Fe_xO_y$ Membranes

All of the experiments were carried out at room temperature (20° C.) at near-neutral pH (5.0-8.0). The pH was monitored throughout the reaction and adjusted by addition of 0.1 mol/L NaOH and 0.1 mol/L $H_2SO_4$. The initial concentration of TCE for the dechlorination reaction was 0.28 mmol/L. Reactions were conducted in 20 mL EPA glass vials which contained pieces of a PVDF-PAA-Fe/$Fe_xO_y$ membrane with a total of 8.7±0.4 mg Fe as Fe/$Fe_xO_y$ nanoparticles and 0.28 mmol/L TCE in either DI water or water obtained from the U.S. DOE Paducah Gaseous Diffusion Plant Superfund Site (total volume of 20 mL). Characterization Batch, instead of convective flow, experiments were conducted in order to limit TCE loss due to volatilization. To initiate the oxidative reactions, 85 μL, of 30 wt % $H_2O_2$ was added to the vial which was then put into the shaker. Control experiments contained no nanoparticles. TCE concentration was analyzed by HP 5890 GC-MS with helium as the carrier gas. The calibration curve for TCE concentration was obtained using TCE concentrations ranging from 0.028 to 0.28 mmol/L in pentane with 1.14 mmol/L 1,2-dibromoethane (EDB) as the internal standard. To extract TCE from the aqueous samples for analysis, 2 mL of the solution was mixed with 2 mL EDB/pentane. All experiments were conducted in duplicate and the average values and standard deviations were reported.

In order to demonstrate the applicability of this technology to the remediation of contaminated water, PVDF-PAA membranes with immobilized Fe/$Fe_xO_y$ nanoparticles (8.7±0.4 mg Fe as Fe/$Fe_xO_y$) and $H_2O_2$ (40 mmol/L) were added to groundwater collected from the areas surrounding the U.S. DOE Paducah Gaseous Diffusion Plant Superfund Site. The degradation of TCE due to the membrane-immobilized Fe/$Fe_xO_y$ nanoparticles was 71±3% in the groundwater sample compared to 80±11% in deionized water after 33 h. This degradation was confirmed by the generation of approximately 3 mol chloride/mol TCE degraded, indicating successful removal of TCE even in the presence of natural groundwater constituents.

What is claimed:

1. A chemical processing cell, comprising:
   an upstream membrane generating hydrogen peroxide from a starting material, wherein said upstream membrane is a layer-by-layer assembly of glucose oxidase in a regenerated cellulose membrane; and
   a downstream membrane decomposing said hydrogen peroxide generated by said upstream membrane, wherein said downstream membrane is a poly(vinylidene fluoride) membrane with poly(acrylic acid) functionalized pores containing immobilized metal, iron, metal ion, iron ion, iron oxide nanoparticles, iron oxyhydroxide nanoparticles, ferrihydrite nanoparticles and mixtures thereof.

2. The cell of claim 1, wherein said downstream membrane further comprises an immobilized catalase enzyme that decomposes hydrogen peroxide produced by said upstream membrane into water and oxygen.

3. The cell of claim 1, wherein glucose oxidase occupies pores of the upstream membrane.

4. The cell of claim 1, further including a housing holding said upstream membrane and said downstream membrane in a flow pathway.

5. A method of detoxifying a water supply, comprising:
   passing said water supply containing a target chemical and a hydrogen peroxide precursor through the cell of claim 1;
   generating hydrogen peroxide from said hydrogen peroxide precursor; and
   decomposing said hydrogen peroxide generated by said upstream membrane into free radical oxidants that oxidize said target chemical.

6. The method of claim 5 including providing glucose as said hydrogen peroxide precursor and reacting said glucose with glucose oxidase immobilized in pores of said upstream membrane to produce said hydrogen peroxide.

7. The method of claim 6 including reacting said hydrogen peroxide generated by said upstream membrane with metal, iron, metal ion, iron ion, iron oxide nanoparticles, iron oxyhydroxide nanoparticles, ferrihydrite nanoparticles and mixtures thereof immobilized in pores of said downstream membrane to produce said free radical oxidants.

8. The method of claim 7 including reacting said target chemical with said free radical oxidants in said pores of said downstream membrane.

9. A method of generating gluconic acid comprising:
   passing glucose through the cell of claim 1;
   generating hydrogen peroxide and gluconic acid from said glucose; and
   decomposing said hydrogen peroxide generated by said upstream membrane into water and oxygen.

10. The method of claim 9 including reacting said glucose with glucose oxidase immobilized in pores of said upstream membrane to produce hydrogen peroxide and gluconic acid.

11. The method of claim 10, including reacting hydrogen peroxide generated by said upstream membrane with catalase enzyme immobilized in pores of said downstream membrane to produce said water and said oxygen.

12. A method of chemical processing, comprising:
    passing a starting material into a first plurality of pores in the upstream membrane of the cell of claim 1;
    reacting said starting material with glucose oxidase in said first plurality of pores in said upstream membrane so as to produce a first reaction product;
    passing said first reaction product into a second plurality of pores in the downstream membrane; and
    reacting said first reaction product with immobilized metal, iron, metal ion, iron ion, iron oxide nanoparticles, iron oxyhydroxide nanoparticles, ferrihydrite nanoparticles and mixtures thereof in said second plurality of pores in said downstream membrane so as to produce a second reaction product.

13. The method of claim 12 including controlling residence time of said starting material in said first plurality of pores and residence time of said first reaction product in said second plurality of pores.

14. The cell of claim 1, wherein functionalized pores of said downstream membrane comprise an immobilized metal.

15. The cell of claim 1, wherein functionalized pores of said downstream membrane comprise immobilized iron.

16. The cell of claim 1, wherein functionalized pores of said downstream membrane comprise immobilized metal ions.

17. The cell of claim 1, wherein functionalized pores of said downstream membrane comprise immobilized iron ions.

18. The cell of claim 1, wherein functionalized pores of said downstream membrane comprise immobilized iron oxide nanoparticles.

19. The cell of claim 1, wherein functionalized pores of said downstream membrane comprise immobilized iron oxyhydroxide nanoparticles.

20. The cell of claim 1, wherein functionalized pores of said downstream membrane comprise immobilized ferrihydrite nanoparticles.

* * * * *